United States Patent
Kuroda et al.

Patent Number: 5,878,364
Date of Patent: Mar. 2, 1999

[54] SHIFT CONTROL APPARATUS

[75] Inventors: Kouichi Kuroda, Yokosuka; Hiroshi Takahashi, Komae, both of Japan

[73] Assignee: Nissan Motor Co., Ltd., Yokohama, Japan

[21] Appl. No.: 774,024

[22] Filed: Dec. 27, 1996

[30] Foreign Application Priority Data

Jan. 4, 1996 [JP] Japan .................................. 8-000052

[51] Int. Cl.$^6$ ...................................................... G06G 7/70
[52] U.S. Cl. .................... 701/56; 701/55; 701/51
[58] Field of Search .................. 701/51, 52, 55, 701/56, 64; 73/117; 477/121, 148, 115, 138, 94, 108; 123/399, 361, 436

[56] References Cited

U.S. PATENT DOCUMENTS

| | | | |
|---|---|---|---|
| 4,919,096 | 4/1990 | Manaka et al. | 123/399 |
| 4,966,049 | 10/1990 | Takahashi | 701/51 |
| 4,967,710 | 11/1990 | Komurasaki et al. | 123/425 |
| 4,969,440 | 11/1990 | Murakami et al. | 123/425 |
| 4,976,239 | 12/1990 | Hosaka | 123/399 |
| 5,483,446 | 1/1996 | Momose et al. | 701/1 |
| 5,566,072 | 10/1996 | Momose et al. | 701/117 |
| 5,609,564 | 3/1997 | Torii et al. | 477/108 |

FOREIGN PATENT DOCUMENTS

| | | |
|---|---|---|
| 6-48225 | 2/1994 | Japan . |
| 6-221414 | 8/1994 | Japan . |
| 6-241304 | 8/1994 | Japan . |

Primary Examiner—Jacques H. Louis-Jacques
Attorney, Agent, or Firm—Foley & Lardner

[57] ABSTRACT

A shift control apparatus for use in an automotive vehicle including an engine, an automatic transmission, and an engine accelerator operable to change the amount of air permitted to enter the engine. The apparatus monitors the speed of operation of the accelerator and repetitively samples the accelerator operation speed to accumulate the last accelerator operation speed values for a short period of time so as to form a first frequency distribution of the accelerator operation speed values and accumulate the last accelerator operation speed values for a long period of time so as to form a second frequency distribution of the accelerator operation speed values. The first frequency distribution corresponds to a driver's present vehicle driving inclination and the second frequency distribution corresponds to a driver's normal vehicle driving inclination. A deviation of the first frequency distribution from the second frequency distribution is detected and used to select one of a plurality of shift schedules. A shift change is produced in the automatic transmission according to the selected shift schedule.

40 Claims, 13 Drawing Sheets

SHIFT CONTROL APPARATUS

BACKGROUND OF THE INVENTION

This invention relates to an apparatus for controlling the shift operation made in an automatic transmission.

It is the current practice to perform shift control with the use of a shift schedule which specifies a target gear or speed ratio as a function of vehicle speed and throttle angle. The shift schedule is normally designed to provide a good balance of fuel economy and vehicle driving performance. With such a conventional shift control utilizing a single shift schedule, however, it is difficult to reflect the driver's driving inclination on the shift control since the driver's vehicle driving inclination is different from one driver to another.

For example, Japanese Patent Kokai Nos. 6-241304, 6-48225 and 6-221414 disclose a shift control apparatus arranged to perform shift control with a selected one of normal and power shift schedules. The power shift schedule is selected to attach a greater importance to the vehicle driving performance than the normal shift schedule when the speed of operation of the accelerator exceeds a reference value at a low vehicle speed. Since the reference value is a fixed value, however, the shift control cannot match the driver's individual vehicle driving inclination.

SUMMARY OF THE INVENTION

It is a main object of the invention to provide an improved shift control apparatus which can perform an appropriate shift control matching the driver's individual vehicle driving inclination.

There is provided, in accordance with the invention, a shift control apparatus for use in an automotive vehicle including an engine, an automatic transmission, and an engine accelerator operable in a first direction to permit an increased amount of air to enter the engine and in a second direction opposite to the first direction. The apparatus comprises sensor means sensitive to a speed of operation of the accelerator for producing an electrical signal indicative of a sensed accelerator operation speed, and a control unit for repetitively sampling the electrical signal to accumulate the last accelerator operation speed values for a short period of time so as to form first frequency distribution of the accelerator operation speed values and accumulate the last accelerator operation speed values for a long period of time so as to form second frequency distribution of the accelerator operation speed values. The first frequency distribution specifies a driver's present vehicle driving inclination and the second frequency distribution specifies a driver's normal vehicle driving inclination. The control unit includes means for detecting a deviation of the first frequency distribution from the second frequency distribution to select one of a plurality of shift schedules based on the detected deviation, and means for producing a shift change in the automatic transmission according to the selected shift schedule.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
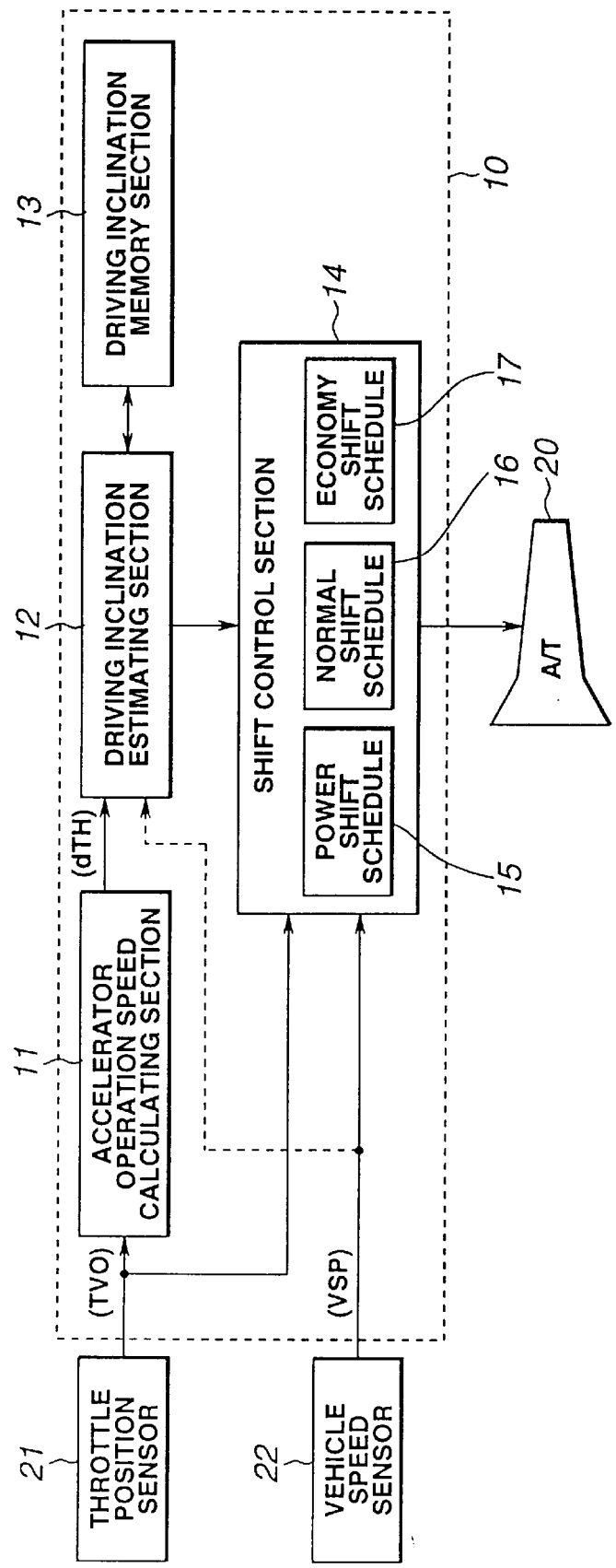
FIG. 1 is a schematic block diagram showing one embodiment of a shift control apparatus made in accordance with the invention.

With reference to the drawings and in particular to FIG. 1, there is shown a schematic block diagram of a gear shift control apparatus embodying the invention. The gear shift control apparatus is intended for use with an automotive vehicle including an internal combustion engine for controlling an automatic transmission 20 through which a drive is transmitted from the engine to the vehicle wheels. The control apparatus includes a control unit 10 for controlling the gear shift operation of the automatic transmission 20 based on vehicle operating conditions including throttle position and vehicle speed. Thus, a throttle position sensor 21 and a vehicle speed sensor 22 are connected to the control unit 10. The throttle position sensor 21 produces an electrical signal indicative of the angle TV0 of rotation of the throttle valve situated within the engine intake passage for controlling the amount of air permitted to enter the engine. The throttle valve is associated with an accelerator. The degree to which the accelerator is operated controls the degree of rotation of the throttle valve. The vehicle speed sensor 22 produces an electrical signal indicative of the speed VSP of traveling of the vehicle.

Figure 2:
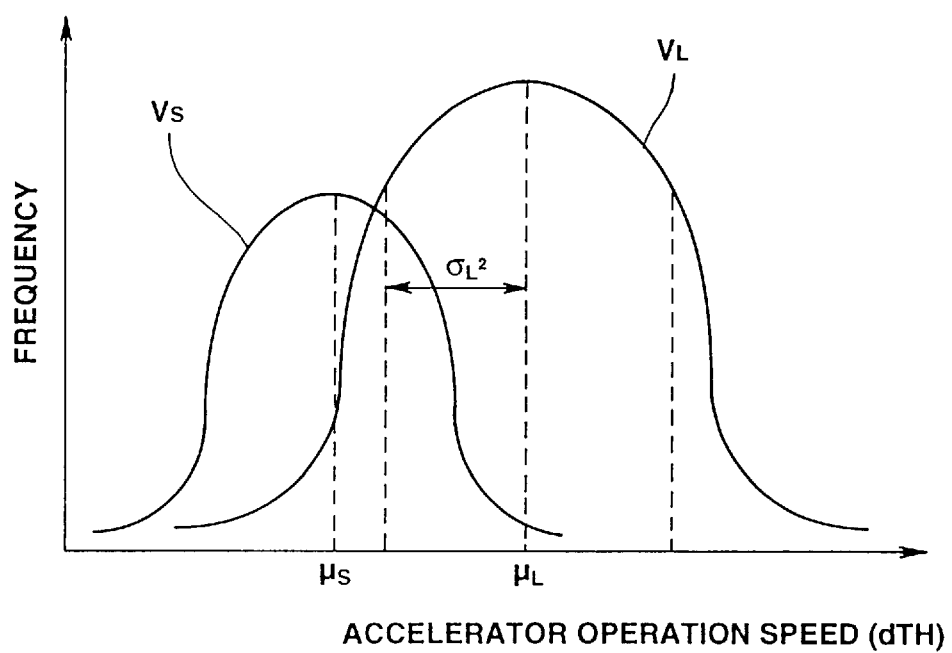
FIG. 2 is a graph of accelerator operation speed versus frequency.

The control unit 10 includes an accelerator operation speed calculating section 11, a driving inclination estimating section 12, a driving inclination memory section 13 and a gear shift control section 14. The accelerator operation speed calculating section 11 repetitively samples the electrical signal fed thereto from the throttle position sensor 21 at uniform intervals of time and calculates an accelerator operation speed dTH in the form of the rate of change of the throttle position for each of the sampled throttle position values. The calculated accelerator operation speeds dTH are transferred in sequence to the driving inclination estimating section 12 which stores them in the driving inclination memory section 13. The driving inclination estimating section 12 calculates a first frequency distribution $V_L$ (FIG. 2) of the last values of the accelerator operation speed dTH accumulated in the memory section 13 in a long period of time, for example, a week and also a second frequency distribution $V_S$ of the last values of the accelerator operation speed dTH accumulated in a short period of time, for example, 30 seconds. The calculated first and second frequency distributions are stored in the memory section 13. The first frequency distribution $V_L$ represents the driver's normal driving inclination and the second frequency distribution Vs represent the present driver's driving inclination. The driving inclination estimating section 12 compares the second frequency distribution $V_S$ with the first frequency distribution $V_L$ to estimate how the present driving inclination is. If the second frequency distribution $V_S$ is close to the first frequency distribution $V_L$, it means that the present driver's driving inclination is similar to the normal driving inclination. Otherwise, it means that the driver exhibits a driving inclination different from the normal driving inclination. For example, the driver would require a stronger vehicle driving performance if the second frequency distribution $V_S$ is separated from the first frequency distribution $V_L$ to a great extent in the direction where the accelerator operation speed dTH increases and a more fuel economical performance if the second frequency distribution $V_S$ is separated from the first frequency distribution $V_L$ to a great extent in the direction where the accelerator operation speed dTH decreases.

The gear shift control section 14 has three types of upshift and downshift schedules each of which defines gear ratio boundaries in terms of vehicle speed (VSP) and throttle position (TV0). The shift schedules include a power shift schedule 15, a normal shift schedule 16 and an economy shift schedule 17. The power shift schedule 15 is arranged to have gear ratio boundaries shifted in the direction where the vehicle speed increases so as to increase the frequency of changes to a lower gear. The power shift schedule 15 gives greater importance to the vehicle driving performance than the normal shift schedule 16. The economy shift schedule 17 is arranged to have gear ratio boundaries shifted in the direction where the vehicle speed decreases so as to increase the frequency of changes to a higher gear. The economy shift schedule 17 gives greater importance to the fuel economy than the normal shift schedule 16. The gear shift control section 14 selects one of the shift schedules 15, 16 and 17 based on the operator's driving inclination estimated in the driving inclination estimating section 12 and controls the gear shift operation of the automatic transmission 20 according to the selected shift schedule.

The control unit 10 may employ a digital computer which includes a central processing unit (CPU), a random access memory (RAM), a read only memory (ROM) and an input/output control unit. The central processing unit communicates with the rest of the computer via a data bus. The read only memory contains the program for operating the central processing unit.

Figure 3:
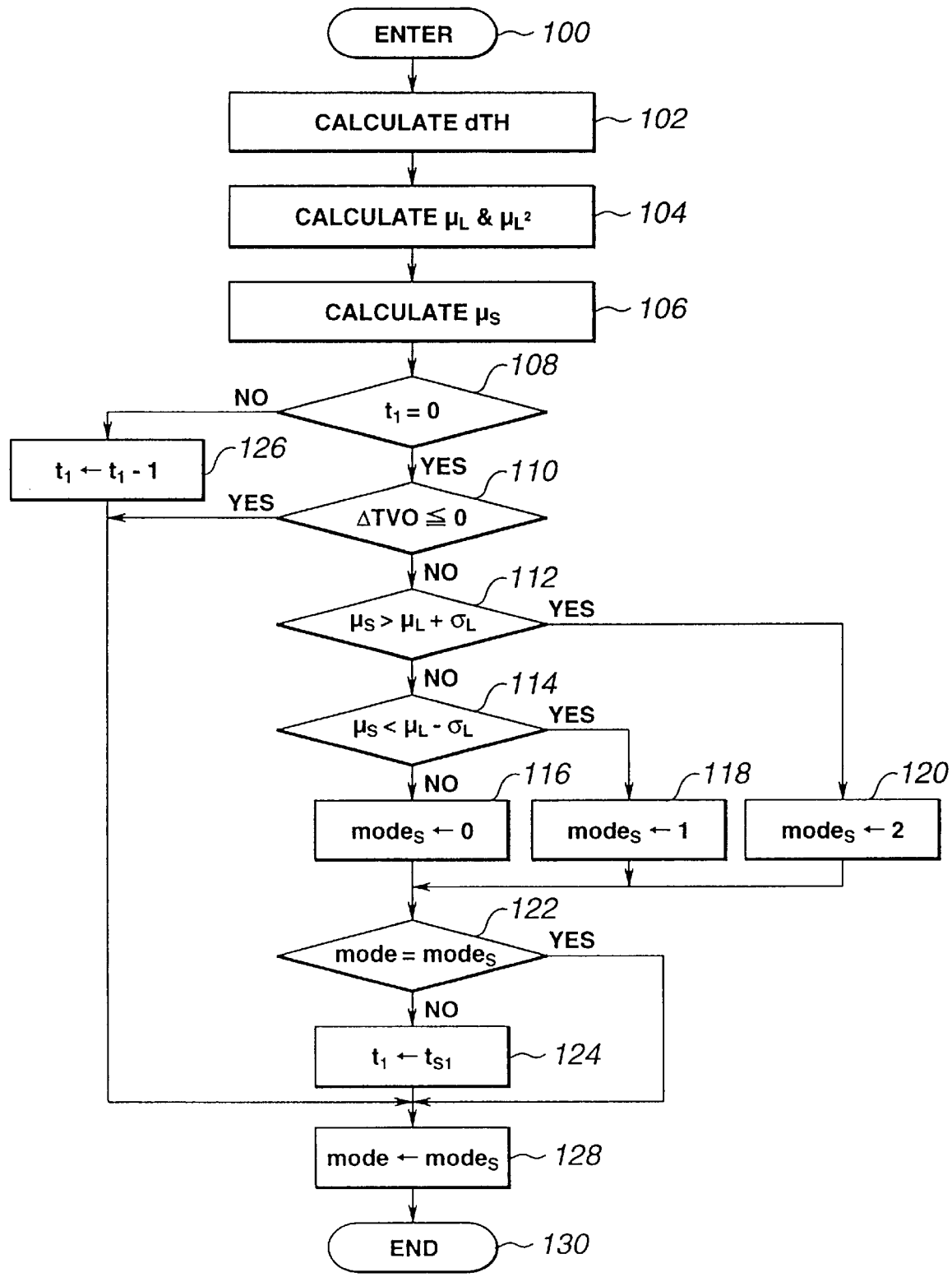
FIG. 3 is a flow diagram illustrating the programming of the digital computer used in the control unit of FIG. 1 for shift schedule selection.

FIG. 3 is a flow diagram illustrating the programming of the digital computer used in the control unit 10 of FIG. 1 for shift schedule selection. The computer program is entered at the entry point 100 at uniform intervals of time Δt, for example, 0.2 seconds. At the point 102 in the program, the accelerator operation speed dTH is calculated as $$dTH = |TV0 \text{ (NEW)} - TV0 \text{ (OLD)}|$$

where TV0 (NEW) is the newly sampled value of the throttle position TV0 and TV0 (OLD) is the last value of the throttle position TV0. The difference of the last value TV0(OLD) from the new value TV0(NEW) corresponds to the throttle position change made in a constant time Δt and to the rate of change of the throttle position TV0. The newly calculated value of the accelerator operation speed dTH is used to update the first and second frequency distributions $V_L$ and $V_S$. At the point 104, the mean value $\mu_L$ and variance $\sigma_L^2$ are calculated for the updated first frequency distribution $V_L$ as $$\mu_L = \frac{\sum_{i=0}^{n_L} dTH(i)}{n_L}$$

$$\sigma_{L2} = \frac{\sum_{i=0}^{n_L} (dTH(i) - \mu_L)^2}{n_L}$$

where dTH(i) is the accelerator operation speed dTH sampled i times before, $n_L = LT/\Delta t$.

At the point 106 in the program, the mean value $\mu_S$ is calculated for the updated second frequency distribution $V_S$ as $$\mu_S = \frac{\sum_{i=0}^{n_L} dTH(i)}{n_S}$$

where dTH(i) is the accelerator operation speed dTH sampled i times before, $n_s = ST/\Delta t$.

At the point 108 in the program, a determination is made as to whether or not a timer t1 is set at zero. If the answer to the question is "yes", then the program proceeds to the point 110. Otherwise, the program proceeds to the point 126 where the timer t1 is decremented by one step. Following this, the program proceeds to the point 128. At the point 110, a determination is made as to whether or not the difference Δ TH0 between the new and old values of the throttle position TH0 is equal to or less than zero. If the answer to this question is "yes", then it means that the accelerator pedal is released and the program proceeds to the point 128. Otherwise, the program proceeds to another determination step at the point 112. This determination is as to whether or not the mean value $\mu_S$ calculated for the updated second frequency distribution $V_S$ is greater than its maximum value ($\mu_L + \sigma_L$), that is, the sum of the mean value $\mu_L$ and standard difference $\sigma_L$ calculated for the updated first frequency distribution $V_L$. If the answer to this question is "yes", then it means that the driver operates the accelerator at such a greater rate as to attach a greater importance to the vehicle driving performance and the program proceeds to the point 120 where a target shift schedule selection command mode$_S$ is set at 2 for selection of the power shift schedule. Otherwise, the program proceeds to another determination step at the point 114. This determination is as to whether or not the mean value $\mu_S$ calculated for the updated second frequency distribution $V_S$ is less than its minimum value ($\mu_L - \sigma_L$), that is, the difference of the standard difference $\sigma_L$ calculated for the updated first frequency distribution $V_L$ from the mean value $\mu_L$ calculated for the updated first frequency distribution $V_L$. If the answer to this question is "yes", then it means that the driver operates the accelerator at such a smaller rate as to attach a greater importance to the fuel economy and the program proceeds to the point 118 where the target shift schedule selection command mode$_S$ is set at 1 for selection of the economy shift schedule. Otherwise, it means that the mean value $\mu_S$ is in the range between its minimum and maximum value to indicate that the driver operates the accelerator in a normal fashion and the program proceeds to the point 116 where the target shift schedule selection command mode$_S$ is set at 0 for selection of the normal shift schedule.

At the point 122 in the program, a determination is made as to whether or not the present shift schedule selection command mode agrees with the target shift schedule section command mode$_S$. If the answer to this question is "yes", then it means that the present shift schedule is to be used continuously and the program proceeds to the point 128. Otherwise, it means that the present shift schedule is to be replaced with the shift schedule selected at the point 116, 118 or 120 and the program proceeds to the point 124 where the timer t1 is set at ts1 and then to the point 128. At the point 128, the selected shift schedule selection command mode$_S$ is outputted so that the control unit 10 employs the selected shift schedule to control the gear shift operation of the automatic transmission 20 in terms of throttle position TV0 and vehicle speed VSP. Following this, the program proceeds to the end point 130.

In this embodiment, the control unit 10 repetitively samples the accelerator operation speed dTH to accumulate the last actual accelerator operation speed values sampled in a long period of time, for example, a week, and also to accumulate the last actual accelerator operation speed values sampled in a short time, for example, 30 seconds. The control unit 10 produces a first frequency distribution V$_L$ of the last accelerator operation speed values and also a second frequency distribution V$_S$ of the last accelerator operation speed values. The control unit 10 selects one of normal, power and economy shift schedules by a comparison of the mean value $\mu_S$ of the second frequency distribution V$_S$ with its minimum and maximum values determined by the mean value $\mu_L$ and variance $\sigma_L$ calculated for the first frequency distribution V$_L$. That is, the minimum value is set as $(\mu_L - \sigma_L)$ and the maximum value is set as $(\mu_L + \sigma_L)$. The first frequency distribution V$_L$ is a good representation of the driver's normal driving inclination and is different from one driver to another. It is, therefore, possible to reflect the driver's normal driving inclination on the gear shift operation of the automatic transmission.

One shift schedule cannot be exchanged for another until a predetermined time ts1 is elapsed after the one shift schedule is selected (see points 108, 124 and 126 of FIG. 3). This is effective to eliminate the tendency toward hunting which results in repeated shift schedule exchanges in a short time. It is possible to obtain a similar effect without the use of the timer t1 by comparing the mean value $\mu_S$ hysteretically with its minimum and maximum values $(\mu_L - \sigma_L)$ and $(\mu_L + \sigma_L)$. If the shift schedule is exchanged when the accelerator pedal is released, a change to a lower gear may be produced to provide a sense of incompatibility to the driver. In this embodiment, the shift schedule cannot be exchanged as long as the accelerator pedal is released (see the point 110 of FIG. 3).

Although the mean values $\mu_L$ and $\mu_S$ and the standard deviation $\sigma_L$ are used to select one of the shift schedules, it is to be understood, of course, that a similar effect can be obtained with the use of the center values of the frequency distribution of the last accelerator operation speed values sampled at uniform intervals of time or with the use of the mean deviation in place of the standard deviation. Although the driver's driving inclination derived from the frequency distribution of the last accelerator operation speed values sampled at uniform intervals is used to select one of the shift schedules, it is to be understood that the driver's driving inclination may be used to change the reference vehicle speed value above which the torque converter operates in a lockup mode where a mechanical connection is completed between the engine and the automatic transmission.

Figure 4:
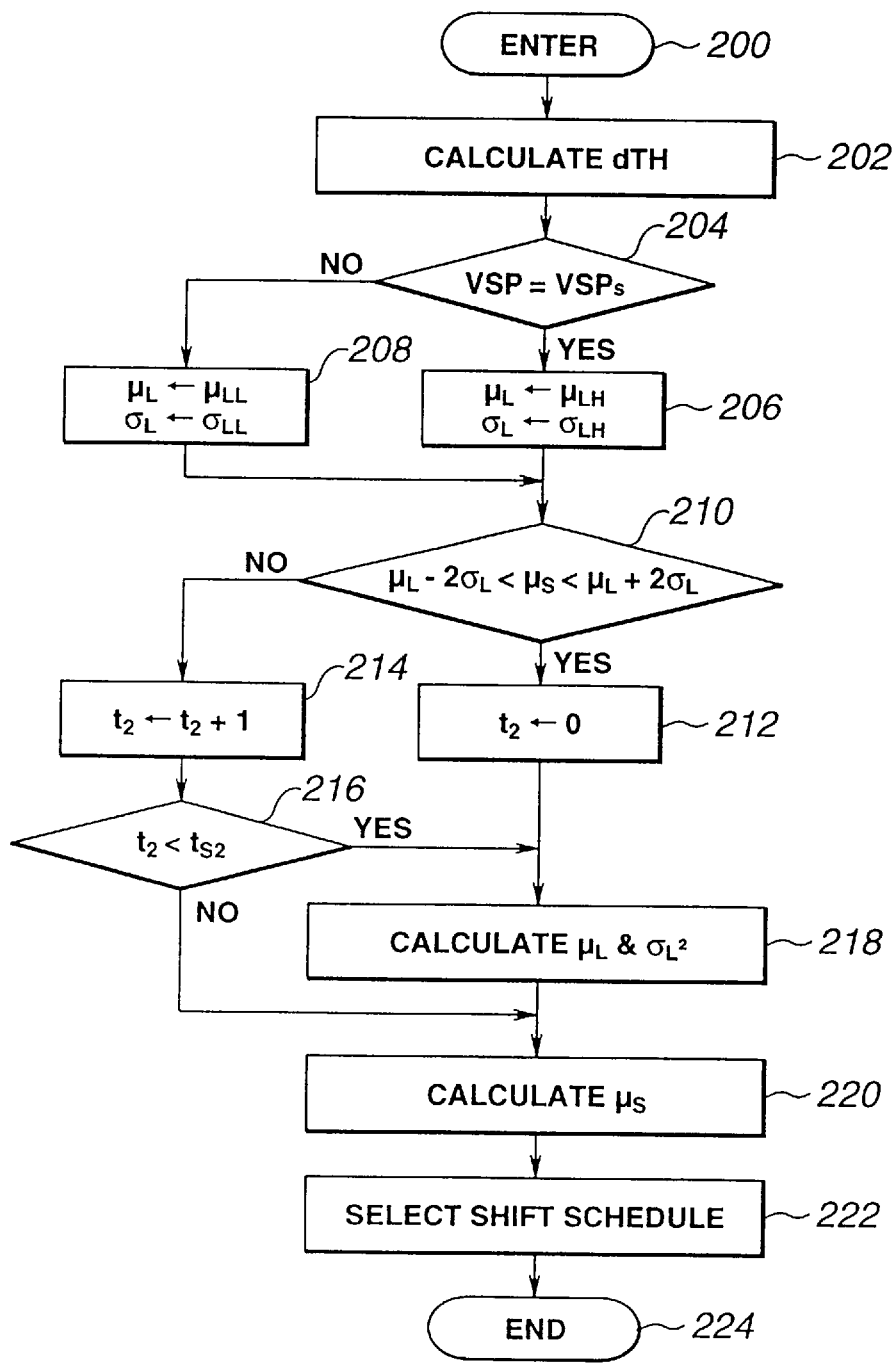
FIG. 4 is a flow diagram illustrating a modified form of the programming of the digital computer used in the control unit of FIG. 1 for shift schedule selection.

FIG. 4 is a flow diagram illustrating a modified form of the programming of the digital computer as it is used for shift schedule selection. The computer program is entered at the point 200 at uniform intervals of time Δt, for example, 0.2 seconds. At the point 202 in the program, the accelerator operation speed dTH is calculated as $$dTH = |TV0 \text{ (NEW)} - TV0 \text{ (OLD)}|$$

where TV0 (NEW) is the newly sampled value of the throttle position TV0 and TV0 (OLD) is the last value of the throttle position TV0. The difference of the last value TV0 (OLD) from the new value TV0 (NEW) corresponds to the throttle position change made in a constant time Δt and to the rate of change of the throttle position TV0. The newly calculated value of the accelerator operation speed dTH is used to update the first and second frequency distributions V$_L$ and V$_S$. At the point 204, a determination is made as to whether or not the vehicle speed VSP is equal to or higher than a predetermined value, for example, 40 km/h. If the answer to this question is "yes", then it means the vehicle speed VSP is in a high vehicle speed range and the program proceeds to the point 206. Otherwise, the program proceeds to the point 208.

At the point 206 in the program, the mean value $\mu_L$ and standard deviation $\sigma_L$ are set respectively at the mean value $\mu_{LH}$ and standard deviation $\sigma_{LH}$ of the frequency distribution V$_{LH}$ of the last accelerator operation speed values sampled at uniform intervals of time for a long period of time when the vehicle speed is in the high speed range. Upon completion of this setting, the program proceeds to the point 210. At the point 208, the mean value $\mu_L$ and standard deviation $\sigma_L$ are set respectively at the mean value $\mu_{LL}$ and standard deviation $\sigma_{LL}$ of the frequency distribution V$_{LL}$ of the last accelerator operation speed values sampled at uniform intervals of time for a long time when the vehicle speed is in the low speed range. Upon completion of this setting, the program proceeds to the point 210.

At the point 210 in the program, a determination is made as to whether or not the mean value $\mu_S$ calculated for the frequency distribution V$_S$ of the last accelerator operation speed values sampled at uniform intervals of time for a short time is in a predetermined range defined between lower and upper limits $(\mu_L - 2\sigma_L)$ and $(\mu_L + 2\sigma_L)$. If the answer to this question is "yes", then the program proceeds to the point 212 where a timer t2 is reset to zero and then to the point 218. Otherwise, it means that the driver operates the accelerator in an abnormal fashion and the program proceeds to the point 214 where the timer t2 is incremented by one step. The timer t2 represents the period of time during which the driver's abnormal accelerator operation continues. Following this, the program proceeds to a determination step at the point 216. This determination is as to whether or not the timer t2 is less than a predetermined value ts2. If the answer to this question is "yes", then the program proceeds to the point 218. Otherwise, the program proceeds to the point 220.

At the point 218 in the program, the mean value $\mu_L$ ($\mu_{LH}$, $\mu_{LL}$) and variance $\sigma_L^2$ ($\sigma_{LH}^2$, $\sigma_{LL}^2$) are calculated for each of the updated frequency distributions V$_{LH}$ and V$_{LL}$ as $$\mu_L = \frac{\sum_{i=0}^{n_L} dTH(i)}{n_L}$$

$$\sigma_L = \frac{\sum_{i=0}^{n_L} (dTH(i) - \mu_L)^2}{n_L}$$

where dTH(i) is the accelerator operation speed dTH sampled i times before, $n_L$=LT/Δt.

At the point 220 in the program, the mean value $\mu_S$ is calculated for the updated second frequency distribution $V_S$ as $$\mu_S = \frac{\sum_{i=0}^{n_L} dTH(i)}{n_S}$$

where dTH(i) is the accelerator operation speed dTH sampled i times before, $n_s$=ST/Δt.

At the point 222 in the program, the standard deviation $\sigma_L$ ($\sigma_{LH}$, $\sigma_{LL}$) calculated based on the means value $\mu_L$ ($\mu_{LH}$, $\mu_{LL}$) and variance $\sigma_L^2$ ($\sigma_{LH}^2$, $\sigma_{LL}^2$) and the mean value $\mu_S$ are used to select one of the normal, power and economy shift schedules substantially in the same manner as described in connection with the points 108 to 126 of FIG. 3. Following this, the program proceeds to the end point 224.

In this modification, the control unit 10 judges that the driver operates the accelerator in an abnormal manner and inhibits the use of the newly calculated value of the accelerator operation speed dTH to update the frequency distribution of the last accelerator operation speed values sampled for a long period of time when the mean value $\mu_S$ calculated for the frequency distribution of the last accelerator operation speed values sampled for a short period of time is out of the predetermined range. Thus, driver's intentional slow or rapid accelerator operation cannot be reflected on the frequency distributions of the accelerator operation speed values sampled for a long period of time. This is effective to ensure good representation of the driver's driving inclination provided for use in selecting one of the shift schedules. Since the shift schedule selection is made based on both of the frequency distribution of the last accelerator operation speed values sampled for a long period of time when the vehicle speed is in the high-speed range and the frequency distribution of the last accelerator operation speed values sampled for a long period of time when the vehicle speed is in the low-speed range, it is possible to select an appropriate shift schedule over the entire vehicle speed range.

Figure 5:
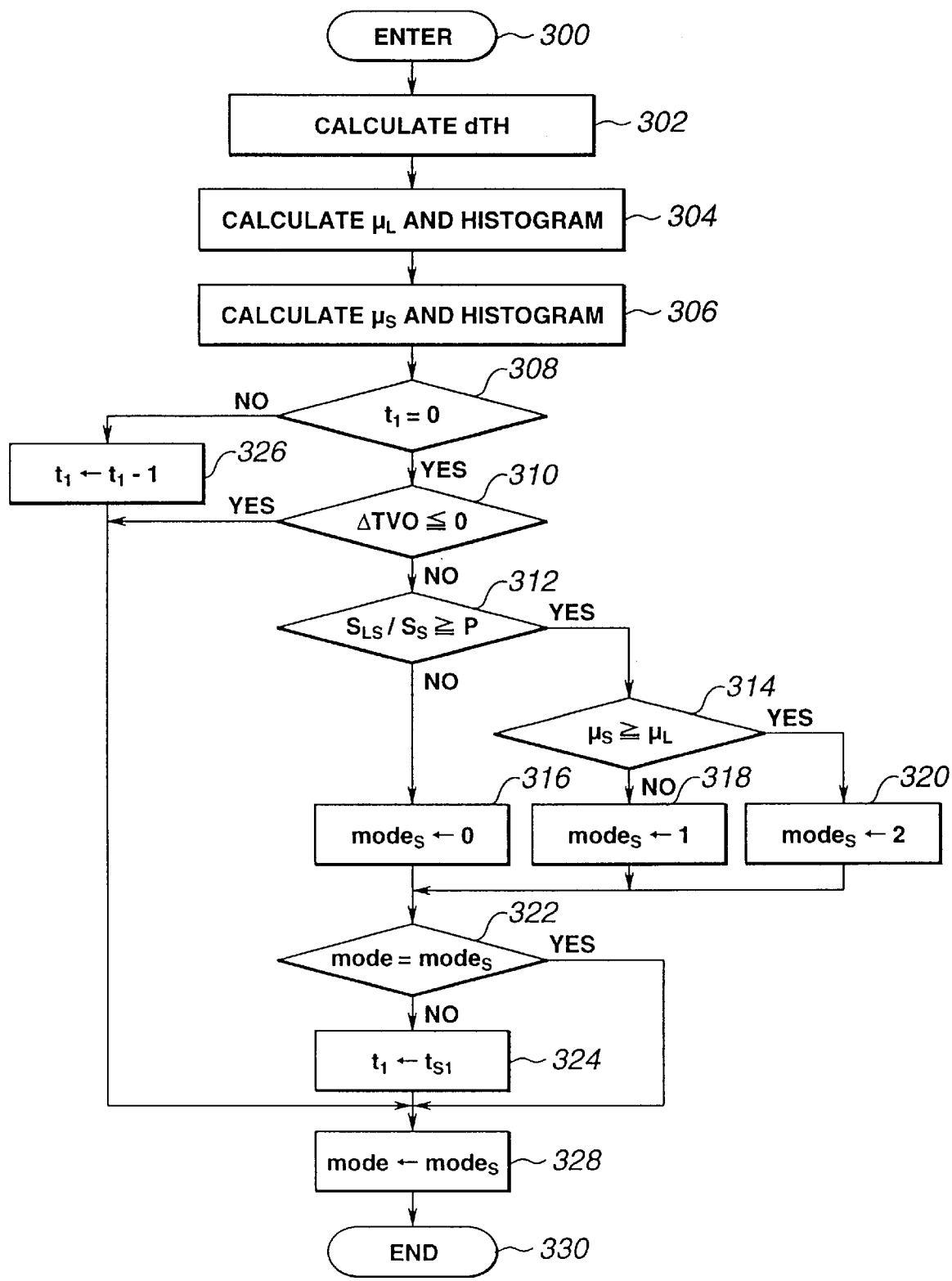
FIG. 5 is a flow diagram illustrating another modified form of the programming of the digital computer used in the control unit of FIG. 1 for shift schedule selection.

FIG. 5 is a flow diagram illustrating the programming of the digital computer used in the control unit 10 of FIG. 1 for shift schedule selection. The computer program is entered at the entry point 300 at uniform intervals of time Δt, for example, 0.2 seconds. At the point 302 in the program, the accelerator operation speed dTH is calculated as $$dTH = |TV0 \text{ (NEW)} - TV0 \text{ (OLD)}|$$

where TV0 (NEW) is the newly sampled value of the throttle position TV0 and TV0 (OLD) is the last value of the throttle position TV0. The difference of the last value TV0 (OLD) from the new value TV0 (NEW) corresponds to the throttle position change made in a constant time Δt and to the rate of change of the throttle position TV0. The newly calculated value of the accelerator operation speed dTH is used to update the first and second frequency distributions $V_L$ and $V_S$. At the point 304, the mean value $\mu_L$ and histogram are calculated for the updated first frequency distribution $V_L$ as $$\mu_L = \frac{\sum_{i=0}^{n_L} dTH(i)}{n_L}$$

where dTH(i) is the accelerator operation speed dTH sampled i times before, $n_L$=LT/Δt. The calculation for the histogram of the updated first frequency distribution $V_L$ will be described later in connection with FIGS. 6 and 7.

At the point 306 in the program, the mean value $\mu_S$ and histogram are calculated for the updated second frequency distribution $V_S$ as $$\mu_S = \frac{\sum_{i=0}^{n_L} dTH(i)}{n_S}$$

where dTH(i) is the accelerator operation speed dTH sampled i times before, $n_s$=ST/Δt. The calculation for the histogram of the updated second frequency distribution $V_L$ will be described later in connection with FIGS. 6 and 7.

At the point 308 in the program, a determination is made as to whether or not a timer t1 is set at zero. If the answer to the question is "yes", then the program proceeds to the point 310. Otherwise, the program proceeds to the point 126 where the timer t1 is decremented by one step. Following this, the program proceeds to the point 328. At the point 310, a determination is made as to whether or not the difference ΔTH0 between the new and old values of the throttle position TH0 is equal to or less than zero. If the answer to this question is "yes", then it means that the accelerator pedal is released and the program proceeds to the point 328. Otherwise, the program proceeds to the point 312.

Figure 6:
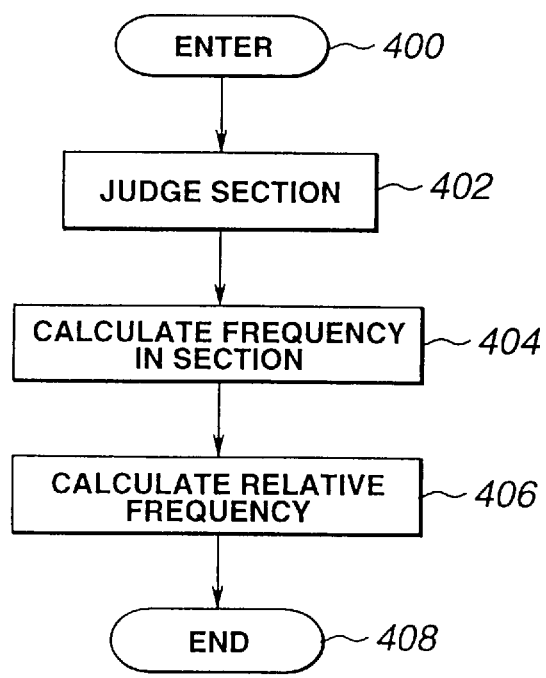
FIG. 6 is a flow diagram of the programming of the digital computer used in the control unit of FIG. 1 for histogram production.
Figure 7:
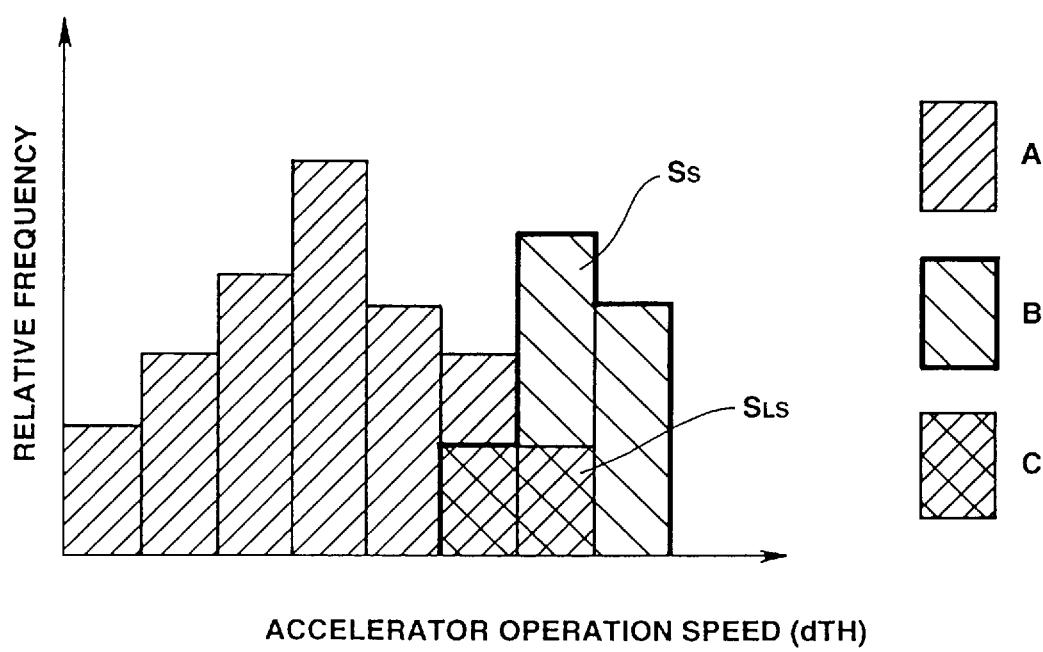
FIG. 7 is a graph of accelerator operation speed versus relative frequency.

Referring to FIG. 6, there is shown a flow diagram of the programming of the digital computer as it is used for histogram production. The computer program is entered at the point 400. At the point 402 in the program, which one of a predetermined number of sections (FIG. 7) include the calculated value of the accelerator operation speed dTH is specified. At the point 404, the counter, used to accumulate a count corresponding to the frequency or the number of times the corresponding section is specified, is incremented by one step. At the point 406, the incremented count is divided by the total number of the counts provided for all of the sections to calculate the relative frequency of the corresponding section. Following this, the program proceeds to the end point 408. Such a sequence of steps is repeated for a long period of time, for example, a week, to produce a first histogram as indicated by the hatched area A of FIG. 7 and for a short period of time, for example, 30 seconds, to produce a second histogram as indicated by the hatched area B of FIG. 7. The first histogram represents the driver's normal driving inclination and the second histogram represents the present driver's driving inclination. Thus, the degree to which the second histogram is separated from the first histogram corresponds to the degree to which the driver operates the accelerator in a manner different from the normal manner. In order to determine this degree of separation of the present driver's driving inclination from the normal driver's driving inclination, the control unit 10 calculates the area $S_{LS}$, indicated by the hatched area C, in which the first and second histograms overlap each other and a ratio $S_{LS}/S_S$ of the calculated area $S_{LS}$ with respect to the area $S_S$ of the second histogram.

Returning to FIG. 5, a determination is made, at the point 312, as to whether or not the calculated ratio $S_{LS}/S_S$ is equal to or greater than a predetermined value P. If the answer to this question is "yes", then it means that the driver operates the accelerator in a manner similar to the normal manner and the program proceeds to the point 316 where a target shift schedule selection command mode$_S$ is set at 0 for selection of the normal shift schedule. Otherwise, it means that the driver operates the accelerator in an abnormal manner and the program proceeds to another determination step at the point 314. This determination is as to whether or not the mean value $_{\mu S}$ calculated for the updated second frequency distribution V$_S$ is equal to or greater than the mean value $_{\mu L}$ calculated for the updated first frequency distribution V$_L$. If the answer to this question is "yes", then it means that the driver operates the accelerator at such a greater rate as to attach a greater importance to the vehicle driving performance and the program proceeds to the point 320 where a target shift schedule selection command mode$_S$ is set at 2 for selection of the power shift schedule. Otherwise, it means that the driver operates the accelerator at such a smaller rate as to attach a greater importance to the fuel economy and the program proceeds to the point 318 where the target shift schedule selection command mode$_S$ is set at 1 for selection of the economy shift schedule.

At the point 322 in the program, a determination is made as to whether or not the present shift schedule selection command mode agrees with the target shift schedule section command mode$_S$. If the answer to this question is "yes", then it means that the present shift schedule is to be used continuously and the program proceeds to the point 128. Otherwise, it means that the present shift schedule is to be replaced with the shift schedule selected at the point 316, 318 or 320 and the program proceeds to the point 324 where the timer t1 is set at ts1 and then to the point 328. At the point 328, the selected shift schedule selection command mode$_S$ is outputted so that the control unit 10 employs the selected shift schedule to control the gear shift operation of the automatic transmission 20 in terms of throttle position TV0 and vehicle speed VSP. Following this, the program proceeds to the end point 330.

In this modification, the control unit 10 repetitively samples the accelerator operation speed dTH to accumulate the last actual accelerator operation speed values sampled in a long period of time, for example, a week, and also to accumulate the last actual accelerator operation speed values sampled in a short period of time, for example, 30 seconds. The control unit 10 produces a first histogram of the last accelerator operation speed values sampled for the long period of time and also a second histogram of the last accelerator operation speed values sampled for the short period of time. The control unit 10 selects one of normal, power and economy shift schedules based on a comparison between the first and second histograms. The first histogram is a good representation of the driver's normal driving inclination and different from one driver to another. It is, therefore, possible to reflect the driver's normal driving inclination on the gear shift operation of the automatic transmission.

Figure 8:
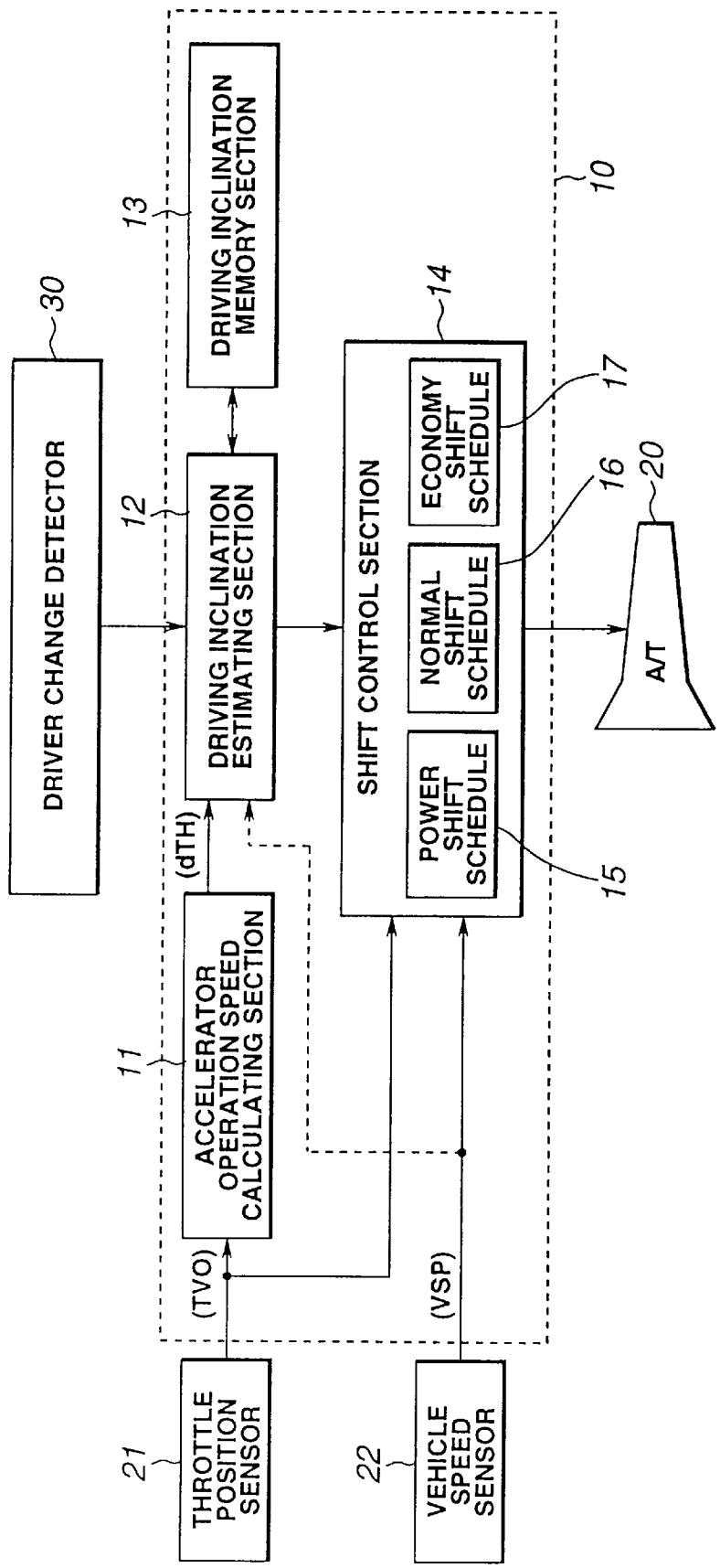
FIG. 8 is a schematic block diagram showing a modified form of the shift control apparatus of the invention.

Referring to FIG. 8, there is shown another modified form of the gear shift control apparatus of the invention. This modification is substantially the same as shown in FIG. 1 except for a driver change detector. The driver change detector 30 produces a signal identifying the vehicle driver to the driving inclination estimating section 12. For example, the driver change detector 30 may employ a change-over switch to be operated prior to a driver's vehicle driving operation or an identification card to be inserted into a card reader prior to a driver's vehicle driving operation.

The driving inclination estimating section 12 produces the frequency distribution or histogram of the accelerator operation speed values sampled for a long period of time for each of the drivers. The frequency distribution or histogram produced for each of the drivers is used for the shift schedule selection in such a manner as described above. The driver's normal driving inclination is different from one driver to another. In this modification, it is, therefore, possible to reflect the driver's normal driving inclination estimated for each of the drivers on the gear shift operation of the automatic transmission.

Figure 9:
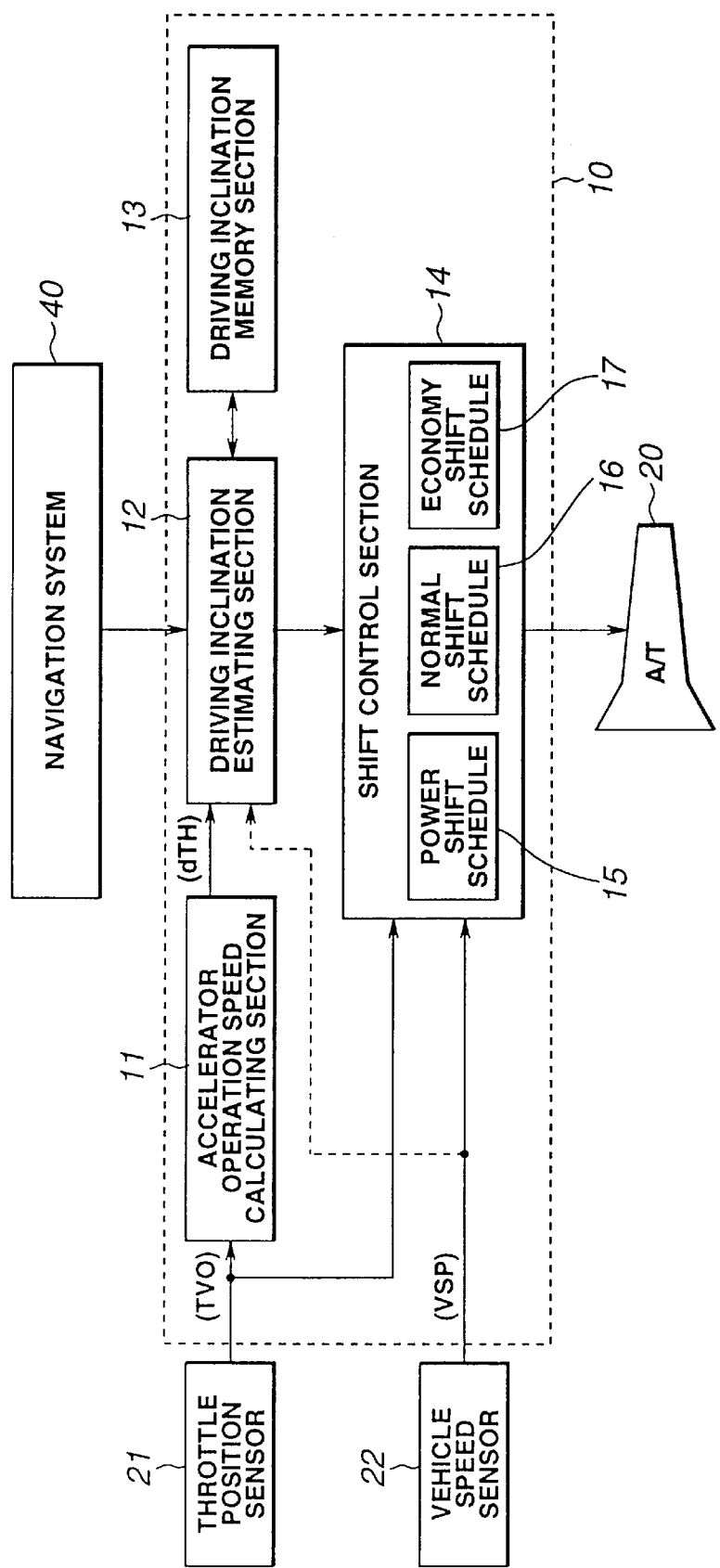
FIG. 9 is a schematic block diagram showing another modified form of the shift control apparatus of the invention.

Referring to FIG. 9, there is shown still another modified form of the gear shift control apparatus of the invention. This modification is substantially the same as shown in FIG. 1 except for a navigation system. The navigation system 40 may be of the conventional type which includes a CD-ROM having map information stored therein, a reader for reading the map information from the CD-ROM, GPS antenna for detecting the position of the vehicle, and a display for indicating the detected vehicle position thereon. The information is transferred from the navigation system 40 to the driving inclination estimating section 12. The driving inclination estimating section 12 produces the frequency distribution or histogram of the accelerator operation speed values sampled for a long period of time.

Figure 10:
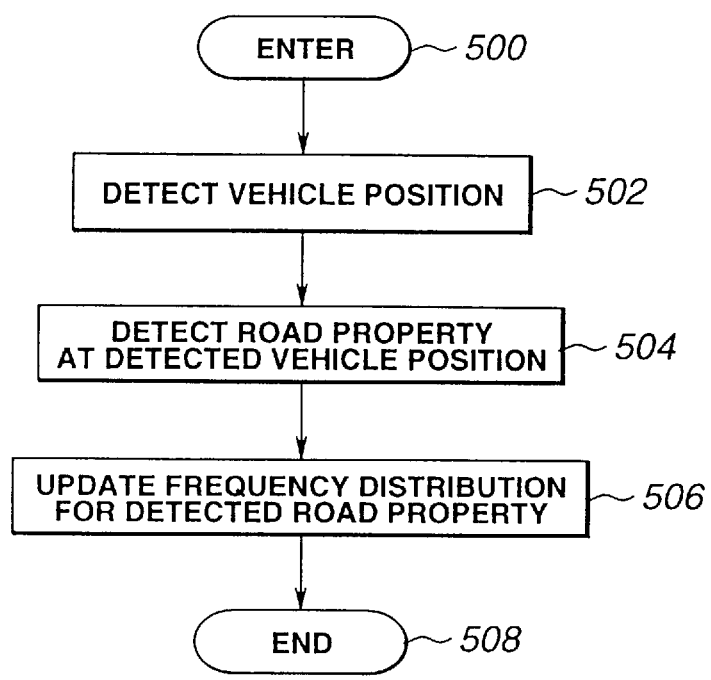
FIG. 10 is a flow diagram illustrating the programming of the digital computer used in the control unit of FIG. 9 for production of a frequency distribution for each road property.

FIG. 10 is a flow diagram of the programming of the digital computer as it is used in the control unit of FIG. 9 to produce the frequency distribution. The computer program is entered at the point 500. At the point 502 in the program, the present portion of the vehicle is detected. At the point 504, a detection is made for the property of the road at the detected vehicle position. The term "road property" designates whether the road on which the vehicle exists is freeway, general, mountain, uphill, downhill, curved or traffic controlled. At the point 506, the first frequency distribution of the accelerator operation speed values sampled for a long period of time is produced, substantially in the same manner as described above, for each of the road properties. The driving inclination estimating section 12 estimates the driver's driving inclination with the use of the first frequency distribution produced for each of the road properties and selects one of the shift schedules based on the estimated driver's driving inclination. In this modification, it is possible to perform an appropriate gear shift control of the automatic transmission even though the driver's driving inclination changes to a great extent according to the road property.

Figure 11:
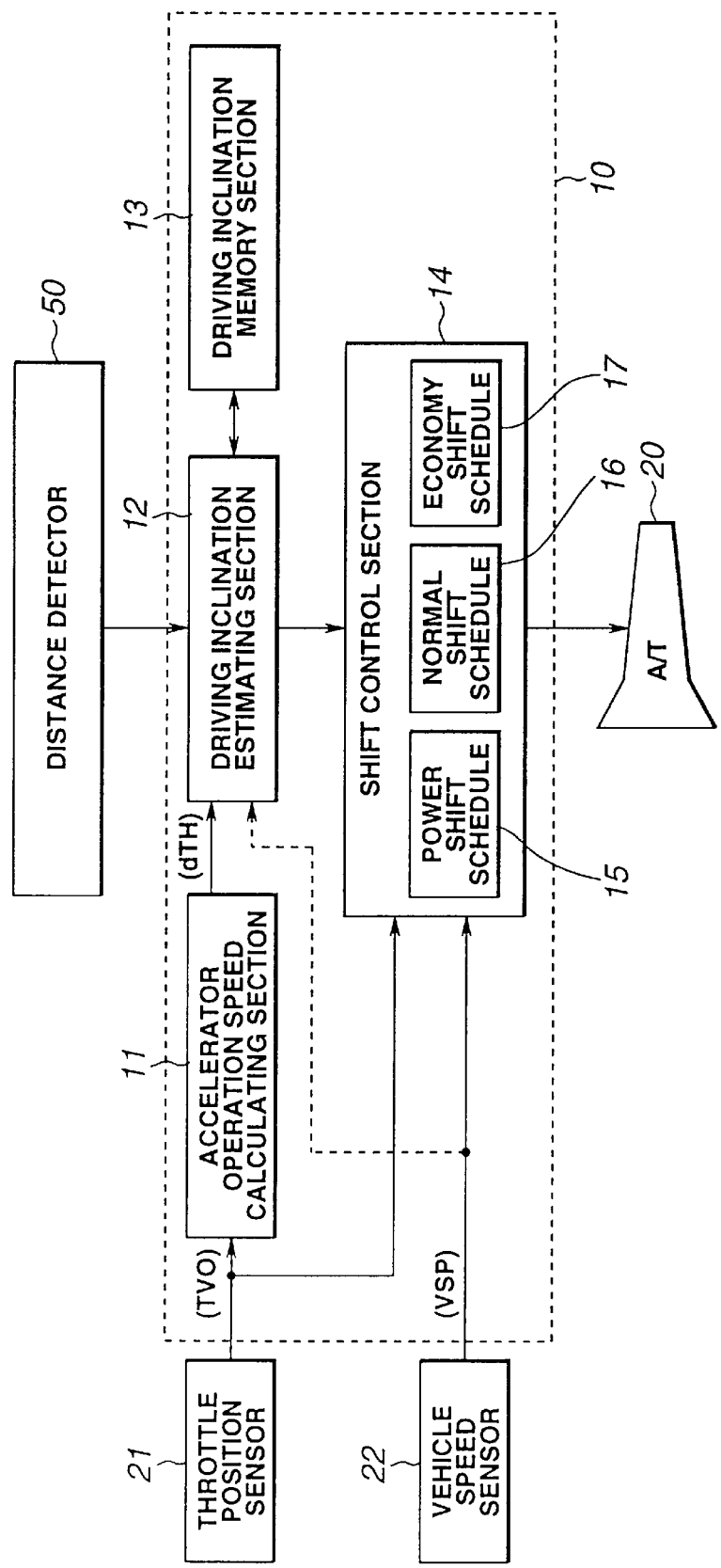
FIG. 11 is a schematic block diagram showing still another modified form of the shift control apparatus of the invention.

Referring to FIG. 11, there is shown still another modified form of the gear shift control apparatus of the invention. This modification is substantially the same as shown in FIG. 1 except for a distance detector. The distance detector 50 detects the distance between a vehicle and the one in front. The distance detector 50 may be of the conventional type employing a laser beam, an ultrasonic wave or a camera. The information on the distance between the vehicle and the one in front is transferred from the distance detector 50 to the driving inclination estimating section 12. The driving inclination estimating section 12 produces the frequency distribution or histogram of the accelerator operation speed values sampled for a long period of time.

Figure 12:
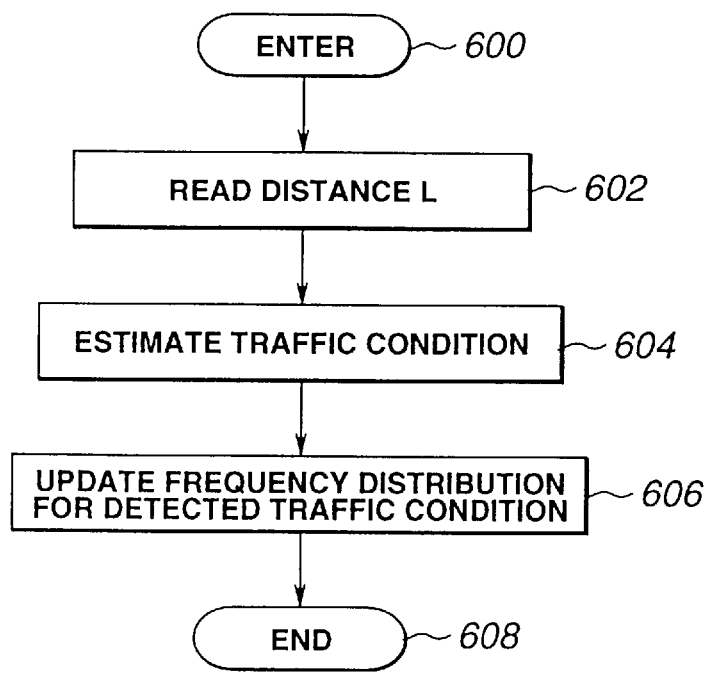
FIG. 12 is a flow diagram illustrating the programming of the digital computer used in the control unit of FIG. 11 for production of a frequency distribution for each road traffic condition.
Figure 13:
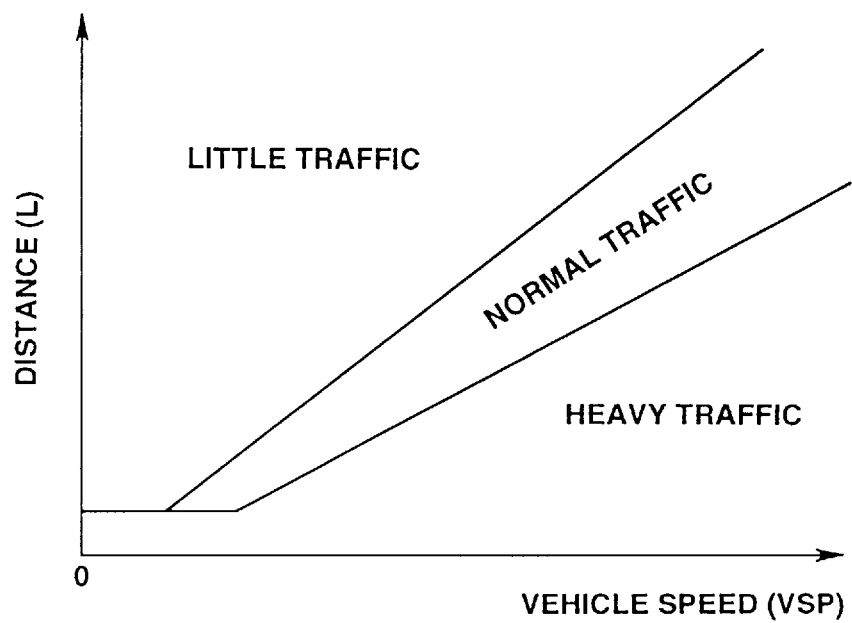
FIG. 13 is a graph of vehicle speed versus distance.

FIG. 12 is a flow diagram of the programming of the digital computer as it is used in the control unit of FIG. 11 to produce the frequency distribution. The computer program is entered at the point 600. At the point 602 in the program, the detected distance L between the vehicle and the one in front is read into the computer memory. At the point 604, the road traffic condition is estimated from a relationship programmed into the computer. This relationship defines the road traffic condition in three different degrees (little, normal and heavy) as a function of distance L and vehicle speed VSP, as shown in FIG. 13. At the point 606, the first frequency distribution of the accelerator operation speed values sampled for a long period of time is produced, substantially in the same manner as described above, for each of the road traffic conditions. The driving inclination estimating section 12 estimates the driver's driving inclination with the use of the first frequency distribution produced for each of the road traffic conditions and selects one of the shift schedules based on the estimated driver's driving inclination. In this modification, it is possible to perform an appropriate gear shift control of the automatic transmission even though the driver's driving inclination changes to a great extent according to the road traffic condition.

While the invention has been described in connection with specified embodiments thereof, it is evident that many alternatives, modifications and variations will be apparent to those skilled in the art. For example, the invention is applicable to a continuously variable transmission. In this case, the gear shift control section 14 is replaced with a shift control section having three types of upshift and downshift schedules each of which defines speed ratio boundaries in terms of vehicle speed (VSP) and throttle position (TV0). Accordingly, it is intended to embrace all alternatives, modifications and variations that fall within the scope of the appended claims.

What is claimed is:

1. A shift control apparatus for use in an automotive vehicle including an engine, an automatic transmission, and an engine accelerator operable in a first direction to permit an increased amount of air to enter the engine and in a second direction, opposite to the first direction, to permit a decreased amount of air to enter the engine, the apparatus comprising:

sensor means sensitive to a speed of operation of the accelerator for producing an electrical signal indicative of a sensed accelerator operation speed; and a control unit for repetitively sampling the electrical signal to accumulate a number of actual values of accelerator operation speed for a short period of time so as to form a first frequency distribution of the accelerator operation speed values and to accumulate a number of actual values of accelerator operation speed for a long period of time so as to form a second frequency distribution of the accelerator operation speed values, the first frequency distribution specifying a driver's present vehicle driving inclination, the second frequency distribution specifying a driver's normal vehicle driving inclination, the control unit including means for detecting a deviation of the first frequency distribution from the second frequency distribution to select one of a plurality of shift schedules based on the detected deviation, and means for producing a shift change in the automatic transmission according to the selected shift schedule.

2. The shift control apparatus as claimed in claim 1, wherein the control unit includes means for calculating a first mean value calculated for the first frequency distribution and a second mean value calculated for the second frequency distribution, means for calculating a difference between the first and second mean values, and means for performing the shift schedule selection based on the calculated difference.

3. The shift control apparatus as claimed in claim 2, wherein the control unit includes means for comparing the first mean value with upper and lower limits, means for selecting a normal shift schedule when the first mean value is between the upper and lower limits, an economy shift schedule, which gives greater importance to fuel economy than the normal shift schedule, when the first means value is less than the lower limit and a power shift schedule, which gives greater importance to vehicle driving performance than the normal shift schedule, when the first means value is greater than the upper limit.

4. The shift control apparatus as claimed in claim 3, wherein the control unit includes means for calculating a standard deviation for the second frequency distribution, means for subtracting the standard deviation from the second mean value to calculate the lower limit, means for adding the standard deviation to the second mean value to calculate the upper limit.

5. The shift control apparatus as claimed in claim 4, wherein the control unit includes means for preventing a change from one shift schedule to another until a predetermined time has elapsed after the one shift schedule is selected so as to avoid a tendency toward hunting.

6. The shift control apparatus as claimed in claim 5, wherein the control unit includes means for preventing a change from one shift schedule to another when the accelerator is operating in the second direction.

7. The shift control apparatus as claimed in claim 4, wherein the control unit includes means for comparing the first mean value hysteretically with the lower limit when the first mean value is decreasing and with the upper limit when the first mean value is increasing so as to avoid a tendency toward hunting.

8. The shift control apparatus as claimed in claim 7, wherein the control unit includes means for preventing a change from one shift schedule to another when the accelerator is operating in the second direction.

9. The shift control apparatus as claimed in claim 3, wherein the control unit includes means for calculating a mean deviation for the second frequency distribution, means for subtracting the mean deviation from the second mean value to calculate the lower limit and, means for adding the mean deviation to the second mean value to calculate the upper limit.

10. The shift control apparatus as claimed in claim 9, wherein the control unit includes means for preventing a change from one shift schedule to another until a predetermined time has elapsed after the one shift schedule is selected so as to avoid a tendency toward hunting.

11. The shift control apparatus as claimed in claim 10, wherein the control unit includes means for preventing a change from one shift schedule to another when the accelerator is operating in the second direction.

12. The shift control apparatus as claimed in claim 9, wherein the control unit includes means for comparing the first mean value hysteretically with the lower limit when the first mean value is decreasing and with the upper limit when the first mean value is increasing so as to avoid a tendency toward hunting.

13. The shift control apparatus as claimed in claim 12, wherein the control unit includes means for preventing a change from one shift schedule to another when the accelerator is operating in the second direction.

14. The shift control apparatus as claimed in claim 1, wherein the control unit includes means for calculating a first center value corresponding to a maximum frequency of the first frequency distribution and a second center value corresponding to a maximum frequency of the second frequency distribution, means for calculating a difference between the first and second center values, and means for performing the shift schedule selection based on the calculated difference.

15. The shift control apparatus as claimed in claim 14, wherein the control unit includes means for comparing the first center value with upper and lower limits, means for selecting a normal shift schedule when the first center value is between the upper and lower limits, an economy shift schedule, which gives greater importance to fuel economy than the normal shift schedule, when the first center value is less than the lower limit and a power shift schedule, which gives greater importance to vehicle driving performance than the normal shift schedule, when the first center value is greater than the upper limit.

16. The shift control apparatus as claimed in claim 15, wherein the control unit includes means for calculating a standard deviation for the second frequency distribution, means for subtracting the standard deviation from the second center value to calculate the lower limit, means for adding the standard deviation to the second center value to calculate the upper limit.

17. The shift control apparatus as claimed in claim 16, wherein the control unit includes means for preventing a change from one shift schedule to another until a predetermined time has elapsed after the one shift schedule is selected so as to avoid a tendency toward hunting.

18. The shift control apparatus as claimed in claim 17, wherein the control unit includes means for preventing a change from one shift schedule to another when the accelerator is operating in the second direction.

19. The shift control apparatus as claimed in claim 16, wherein the control unit includes means for comparing the first mean value hysteretically with the lower limit when the first mean value is decreasing and with the upper limit when the first mean value is increasing so as to avoid a tendency toward hunting.

20. The shift control apparatus as claimed in claim 19, wherein the control unit includes means for preventing a change from one shift schedule to another when the accelerator is operating in the second direction.

21. The shift control apparatus as claimed in claim 15, wherein the control unit includes means for calculating a mean deviation for the second frequency distribution, means for subtracting the mean deviation from the second center value to calculate the lower limit, and means for adding the mean deviation to the second center value to calculate the upper limit.

22. The shift control apparatus as claimed in claim 21, wherein the control unit includes means for preventing a change from one shift schedule to another until a predetermined time has elapsed after the one shift schedule is selected so as to avoid a tendency toward hunting.

23. The shift control apparatus as claimed in claim 22, wherein the control unit includes means for preventing a change from one shift schedule to another when the accelerator is operating in the second direction.

24. The shift control apparatus as claimed in claim 21, wherein the control unit includes means for comparing the first mean value hysteretically with the lower limit when the first mean value is decreasing and with the upper limit when the first mean value is increasing so as to avoid a tendency toward hunting.

25. The shift control apparatus as claimed in claim 24, wherein the control unit includes means for preventing a change from one shift schedule to another when the accelerator is operating in the second direction.

26. The shift control apparatus as claimed in claim 1, wherein the control unit includes means for calculating a first area of the first frequency distribution, means for calculating a second area in which the first and second frequency distributions overlap each other, means for calculating a ratio of the second area with respect to the first area, and means for performing the shift schedule selection based on the calculated ratio.

27. The shift control apparatus as claimed in claim 26, wherein the control unit includes means for calculating a first mean value calculated for the first frequency distribution and a second mean value calculated for the second frequency distribution, means for comparing the calculated ratio with a predetermined value, means for selecting a normal shift schedule when the calculated ratio is equal to or greater than the predetermined value, means for selecting an economy shift schedule which gives greater importance to fuel economy than the normal shift schedule, when the calculated ratio is less than the predetermined value and the first mean value is less than the second mean value, and means for selecting a power shift schedule, which gives greater importance to vehicle driving performance than the normal shift schedule, when calculated ratio is less than the predetermined value and the first means value is equal to or greater than the second mean value.

28. The shift control apparatus as claimed in claim 27, wherein the control unit includes means for preventing a change from one shift schedule to another until a predetermined time has elapsed after the one shift schedule is selected so as to avoid a tendency toward hunting.

29. The shift control apparatus as claimed in claim 28, wherein the control unit includes means for preventing a change from one shift schedule to another when the accelerator is operating in the second direction.

30. The shift control apparatus as claimed in claim 26, wherein the control unit includes means for calculating a first center value corresponding to a maximum frequency of the first frequency distribution and a second center value corresponding to a maximum frequency of the second frequency distribution, means for comparing the calculated ratio with a predetermined value, means for selecting a normal shift schedule when the calculated ratio is equal to or greater than the predetermined value, means for selecting an economy shift schedule, which gives greater importance to fuel economy than the normal shift schedule, when the calculated ratio is less than the predetermined value and the first center value is less than the second center value, and means for selecting a power shift schedule, which gives greater importance to vehicle driving performance than the normal shift schedule, when calculated ratio is less than the predetermined value and the first center value is equal to or greater than the second center value.

31. The shift control apparatus as claimed in claim 30, wherein the control unit includes means for preventing a change from one shift schedule to another until a predetermined time has elapsed after the one shift schedule is selected so as to avoid a tendency toward hunting.

32. The shift control apparatus as claimed in claim 31, wherein the control unit includes means for preventing a change from one shift schedule to another when the accelerator is operating in the second direction.

33. The shift control apparatus as claimed in claim 1, wherein the control unit includes means for preventing the sampled accelerator operation speed value from being used to update the second frequency distribution when a deviation of the first frequency distribution from the second frequency distribution exceeds a predetermined value.

34. The shift control apparatus as claimed in claim 1, wherein the control unit includes means for producing the first and second frequency distributions for each of specified drivers, means for detecting, for each driver, a deviation of the first frequency distribution from the second frequency distribution to select one of a plurality of shift schedules based on the detected deviation, and means for producing a shift change in the automatic transmission according to the selected shift schedule.

35. The shift control apparatus as claimed in claim 1, wherein the control unit includes means for producing the first and second frequency distributions for each of specified vehicle speed ranges, means for detecting, for each vehicle speed range, a deviation of the first frequency distribution from the second frequency distribution to select one of a plurality of shift schedules based on the detected deviation, and means for producing a shift change in the automatic transmission according to the selected shift schedule.

36. The shift control apparatus as claimed in claim 1, wherein the control unit includes means for producing the first and second frequency distributions for each of specified road properties, means for detecting, for each road property, a deviation of the first frequency distribution from the second frequency distribution to select one of a plurality of shift schedules based on the detected deviation, and means for producing a shift change in the automatic transmission according to the selected shift schedule.

37. The shift control apparatus as claimed in claim 36, wherein the control unit includes means for detecting the road property based on information fed thereto from a navigation system.

38. The shift control apparatus as claimed in claim 1, wherein the control unit includes means for producing the first and second frequency distributions for each of specified road traffic conditions, means for detecting, for each road traffic condition, a deviation of the first frequency distribution from the second frequency distribution to select one of a plurality of shift schedules based on the detected deviation, and means for producing a shift change in the automatic transmission according to the selected shift schedule.

39. The shift control apparatus as claimed in claim 38, wherein the control unit includes means for detecting the road traffic condition based on vehicle speed and a distance between the vehicle and one in front.

40. The shift control apparatus as claimed in claim 1, wherein the control unit includes means for changing a reference vehicle speed value above which a mechanical connection is completed between the engine and the automatic transmission.

* * * * *